US012743656B2

(12) United States Patent
Fröhlich et al.

(10) Patent No.: US 12,743,656 B2
(45) Date of Patent: Sep. 22, 2026

(54) DRIFT MODE ACQUISITION USING SUCCESSIVE MODEL TRAINING

(71) Applicant: Dell Products L.P., Round Rock, TX (US)

(72) Inventors: Herberth Birck Fröhlich, Florianópolis (BR); Vinicius Michel Gottin, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 1028 days.

(21) Appl. No.: 17/937,204

(22) Filed: Sep. 30, 2022

(65) Prior Publication Data

US 2024/0112070 A1 Apr. 4, 2024

(51) Int. Cl.

| | |
|---|---|
| ***G06N 20/10*** | (2019.01) |
| ***G06F 18/2137*** | (2023.01) |
| ***G06N 5/04*** | (2023.01) |
| ***G06N 20/00*** | (2019.01) |

(52) U.S. Cl.
CPC ......... *G06N 20/00* (2019.01); *G06F 18/2137* (2023.01); *G06N 5/04* (2013.01)

(58) Field of Classification Search
CPC ....... G06N 20/00; G06N 5/04; G06F 18/2137
See application file for complete search history.

(56) References Cited

U.S. PATENT DOCUMENTS

2019/0207388 A1* 7/2019 Li .......................... G06Q 10/06
2022/0051129 A1* 2/2022 Malvankar ............ G06F 9/4881
2022/0309407 A1* 9/2022 Ramirez .................. G06F 8/60

OTHER PUBLICATIONS

"Detection of calibration drift in clinical prediction models to inform model updating" Davis et al. ("Davis") Oct. 29, 2020 pp. 1-10.*

B. Firas, B. Ahmed e A. Kassier, "From concept drift to model degradation: An overview on performance-aware drift detectors," Knowledge-Based Systems, vol. 245, 2022.

* cited by examiner

*Primary Examiner* — Sherrod L Keaton
(74) *Attorney, Agent, or Firm* — Workman Nydegger

(57) ABSTRACT

One example method includes defining a time window during which a drift mode of a machine learning model will be evaluated, and the time window begins at $t_0$, training, beginning at the time $t_0$, a reduced reference model $R_0$ with a data sample $d_0$ that is a subset of a training dataset that was used to train the machine learning model; for 'n' iterations: at a time $t_i$, when new data samples $d_i$ are available, train a new version $R_i$ of the reduced reference model $R_0$; after $R_i$ is trained, collect data $v_i$; and compare respective inference values generated by the reduced reference model $R_0$ and $R_i$, using the data samples $d_0$ and $v_i$, and store an absolute difference between the inference values; defining a drift mode curve using the absolute differences; and based on the drift mode curve, determining a drift mode of the machine learning model.

14 Claims, 4 Drawing Sheets

DRIFT MODE ACQUISITION USING SUCCESSIVE MODEL TRAINING

FIELD OF THE INVENTION

Embodiments of the present invention generally relate to machine learning models. More particularly, at least some embodiments of the invention relate to systems, hardware, software, computer-readable media, and methods, for detection of drift in the operation of machine learning models

BACKGROUND

Drift may be defined as a deterioration in performance measured in the in-use metric of a data-driven method over time, either because the input distribution has changed or because the mapping between input and output has changed. This drop in performance is silent because it can be interpreted, incorrectly, as a normal low performance level. Delaying addressing this problem can lead to wrong decisions about the output of the model, thereby jeopardizing an entire chain of events that may be dependent for their implementation and effectiveness upon production of the correct output by the model.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
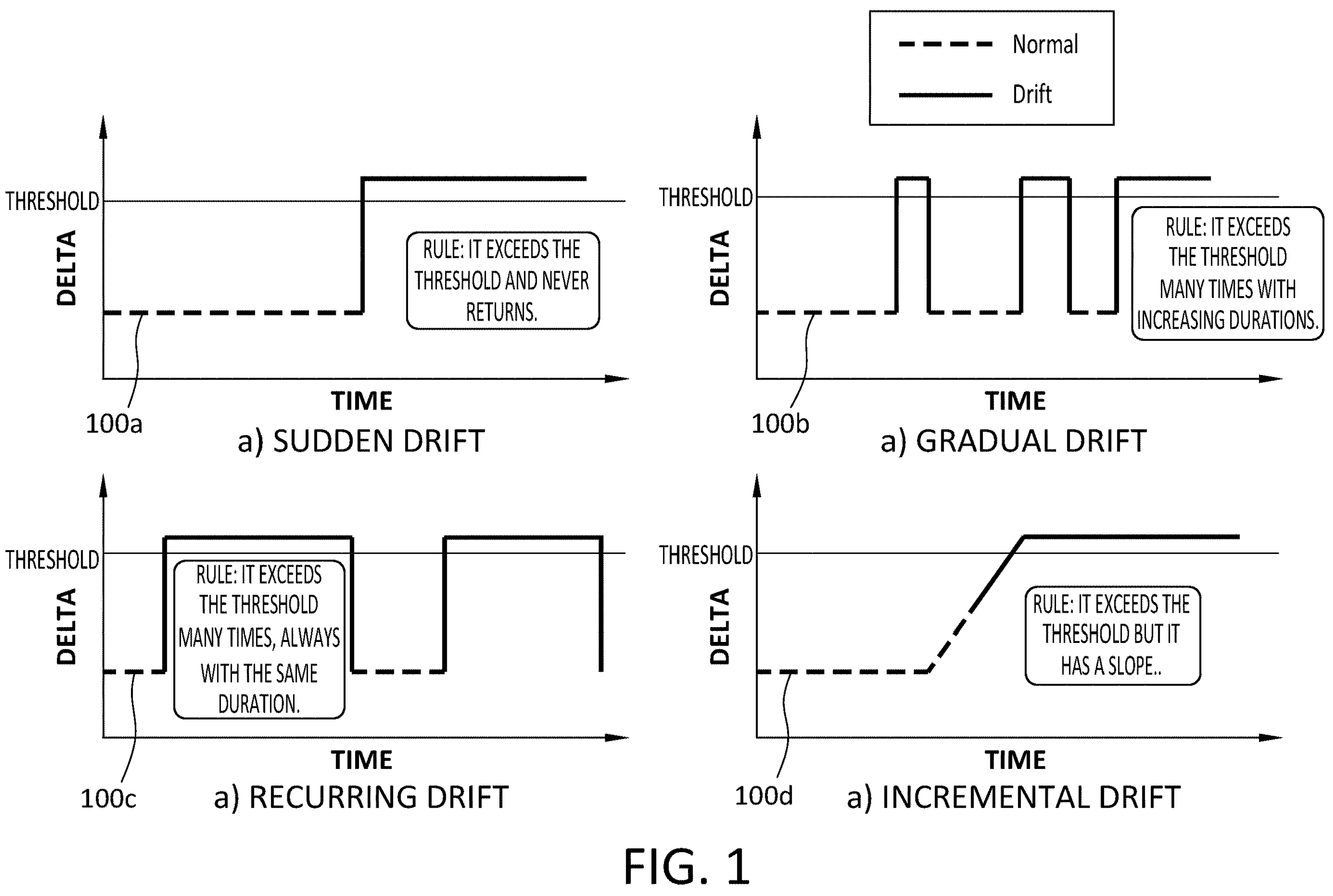
FIG. 1 discloses aspects of various example drift modes.

Embodiments of the present invention generally relate to machine learning models. More particularly, at least some embodiments of the invention relate to systems, hardware, software, computer-readable media, and methods, for detection of drift in the operation of machine learning models In general, some example embodiments of the invention may address the drift mode detection problem in machine learning (ML) models by using recurrent training of overfitted sub-models to: (1) inform the choice of drift detection method to be used during operation of the model; and (2) make clear the moment at which the model should be completely or partially retrained or even replaced by another one better suited to that drift mode. Some embodiments may provide for the construction of the drift model regardless of whether the model serves a supervised or unsupervised problem, for both classification and regression problems, since the drift mode curve(s) for a model may be constructed using only the absolute difference in inference of the sub-models that are in use.

More particularly, some embodiments may operate to identify a drift mode progression by creating a progression of absolute difference curves from successive comparisons between a reference model and subsequent sub-models trained at well-spaced intervals. The absolute difference curves may then be used to determine whether drift is occurring in the main model and, if so, what type of drift is occurring.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of some embodiments of the invention is that an embodiment may enable diagnoses of the performance of a machine learning model. An embodiment may enable a determination as to whether a machine learning model should be modified, or replaced. An embodiment may not require the use of the main model in order to determine the drift in that main model. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. OVERVIEW

The following is an overview of aspects of some example embodiments of the invention. This discussion is not intended to limit the scope of the invention, or the applicability of the embodiments, in any way.

As noted earlier herein, drift is defined as a deterioration in performance measured in the in-use metric of a data-driven method over time, either because the input distribution has changed or because the mapping between input and output has changed. The progress of a drift event can be indirectly detected, and the literature presents four main modes of drift evolution: sudden, gradual, incremental and reoccurring. By discovering the ongoing drift mode, it may be possible to define the best strategy to be applied during operation, that is, the drift detection method.

Some embodiments of the invention may address the drift mode detection problem by implementing recurrent training of overfitted sub models. Use of this approach may inform the choice of drift detection method to be used during operation. As well, this approach may be used to determine the moment at which the model should be completely or partially retrained, or even replaced by another model better suited to that drift mode.

In more detail, some example embodiments may operate to identify the drift mode among the four main modes present in the literature, that is, sudden, gradual, incremental, and recurring, so that the choice of the imputation method is more assertive. A dataset at each instant 't' may be employed in some embodiments. This dataset may be a small version of the dataset that is used to train the operational model. In this way, it may be possible to store the desired number of observations during recurrent training.

In brief, some embodiments may comprise the following operations:

1. define a time window of interest where the drift mode will be searched;
2. train a reduced reference model $R_0$ at time $t_0$ with a small sample $d_0$ of the main dataset, that is, the training dataset for the main model upon which the model $R_0$ is based, up to the overfitting point—and store the reference model $R_0$;
3. then, for a predetermined number of steps n:
   a. at time $t_i$, when new samples $d_i$ are available, train a new version of the reduced reference model $R_i$, until the new version overfits the new data samples $d_i$—note that $|d_i|=|d_0|$ samples may be expected to be acquired between $t_i-1$ and $t_i$;
   b. compare respective inferences generated by $R_0$ and $R_i$, and store the difference between those values as δ (an absolute delta value);
4. compose a series of the n deltas available, so as to define a drift mode curve; and
5. apply a suitable algorithm to determine the appropriate drift detection model—this algorithm may leverage similarity metrics, statistics and/or machine learning to match the drift mode curve to drift mode curve templates.

In some embodiments, the reduced reference models R may be used only for drift mode building and not for true inference and other decision-making processes. That is, the reduced reference models R may be model trained up to the point of overfitting the applicable dataset as this is, in theory, the best possible performance of that model R, which may be likely to be unachievable in operation due to loss of generalization implied by the reduced reference model R. Embodiments may consider that the overfitted models provide a coherent comparison basis for their inference results quality.

Notably, some embodiments may operate to construct a drift model regardless of whether the model serves a supervised or unsupervised problem, for both classification and regression problems since, in such embodiments, the drift progress curve may be constructed using only the absolute difference in inference of the models in use.

B. FURTHER ASPECTS OF SOME EXAMPLE EMBODIMENTS

In general, some example embodiments operate to create a progression of absolute difference curves from successive comparisons between a reference model, and subsequent models trained at well-spaced intervals. The drift progressions, which may also be referred to herein as 'drift modes,' of interest are presented in FIG. 1 along with the detection rules that define them.

Particularly, FIG. 1 discloses drift modes 100*a*, 100*b*, 100*c*, and 100*d*. In drift mode 100*a*, a sudden drift, the drift of the model may be characterized by a sudden jump to a point above a defined threshold, and then remains at that level, never returning to the below-threshold value.

Drift mode 100*b*, a gradual drift, may be characterized by a series of jumps above the threshold, and then returning to a point below the threshold each time. Note however that in drift mode 100*b*, the drift exceeds the threshold numerous times, and each time the drift goes over the threshold, the time spent above the threshold grows longer.

With reference next to drift mode 100*c*, a recurring drift may be characterized by a series of jumps above the threshold, and then returning to a point below the threshold each time. In this case, the time spent above the threshold remains about the same each time.

Finally, the incremental drift mode 100*d* may be characterized by a gradual, rather than sudden, movement of the drift over the threshold. This gradual movement is shown as a slope in FIG. 1. Once above the threshold, the drift may remain above the threshold.

Note that some embodiments may be based on a few assumptions, namely: (i) models, such as some of the sub-models disclosed herein, trained with the most up-to-date data may capture the current distribution of the data, and not suffer from drift; (ii) overfitted models, such as some of the sub-models disclosed herein, may carry all the information possible from their training dataset, at the expense of generalization; and (iii), models and/or sub-models may perform worse under any kind of drift. Some, or all, of these assumptions may or may not be implied by one or more embodiments.

Figure 2:
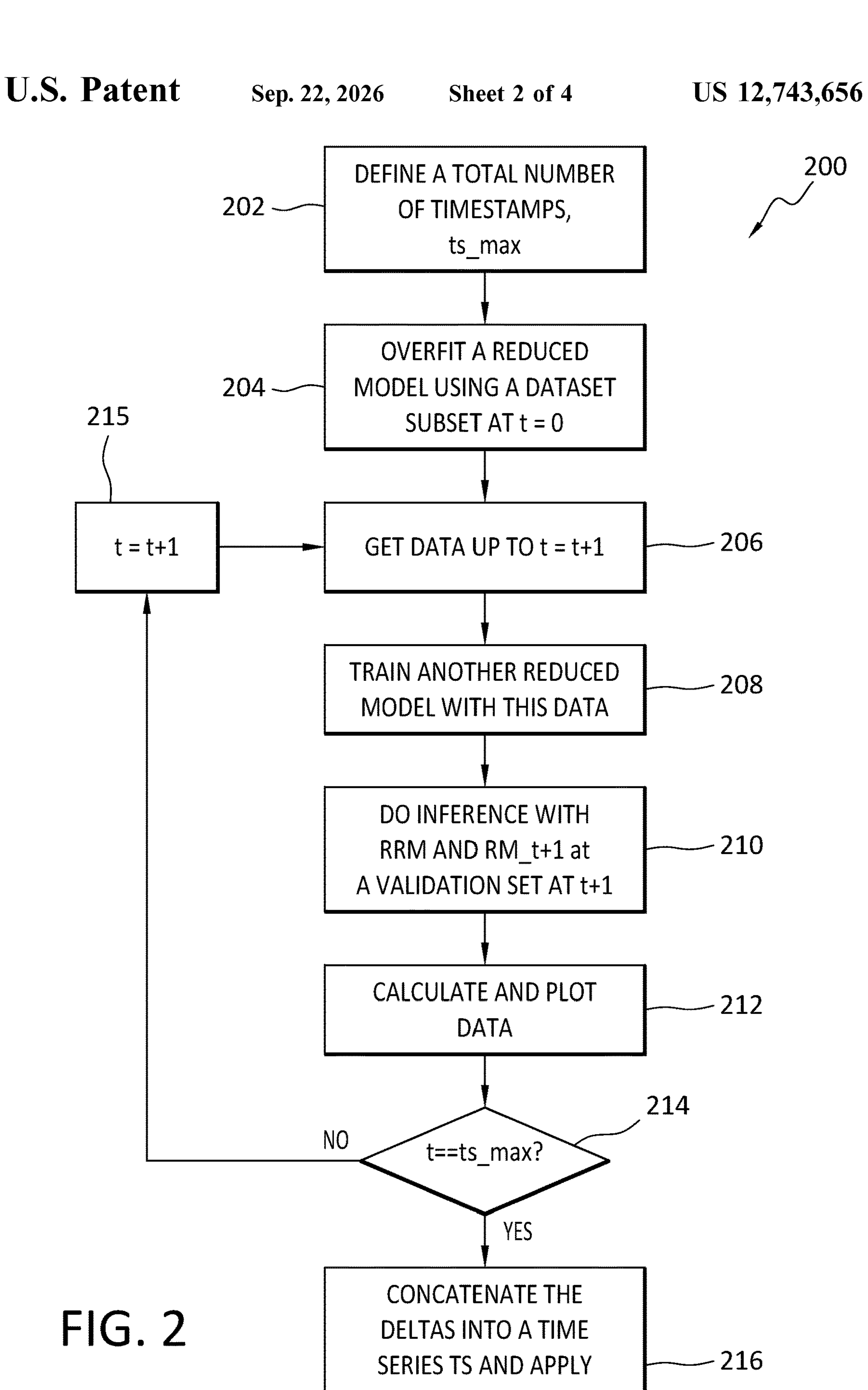
FIG. 2 discloses aspects of an example method according to some embodiments.

With attention now to FIG. 2, details are provided concerning an example method 200 for a drift mode building, or drift mode acquisition, online stage. The example method 200 may begin at 202 where a total number of timestamps is defined that will determine how long the method 200 will run. That is, is max is responsible to define how long the method 200 will run. Note that embodiments of the method 200 may be parametrized to operate for n iterations, that is, the length of time the method 200 will run. The implications of setting this parameter n are discussed elsewhere herein.

At 204, a Reference Reduced Model (RRM), or sub-model, may be trained. In general, 204 may involved overfitting a reduced model using a dataset subset, that is, a subset of a training dataset for the main model from which the RRM is derived, at t=0. Note that the RRM may be overfitted because it may represent the maximum possible knowledge that a model can extract from a dataset. The dataset subset size, D_s, may be arbitrarily defined, and the same number of observations as are in the dataset subset may be acquired multiple further times. Next, data with size D_s may be stored 206 until the next milestone t+1 is reached. The datasets D, may all have the same number of observations, or their observations may be within plus/minus 5% of each other.

The data stored at 206 may then be used to train 208 another RRM, namely, RM_t+1. Note that respective datasets data used to train RRMs may be acquired in respective time intervals defined by respective pairs of timestamps. Thus, the collected data may not be cumulative, or accumulated. That is, each dataset that is collected may be used to train, only, a different respective RRM. To illustrate, a first dataset collected in time interval 1 may be used to train RRM-1, and a second dataset collected in a subsequent time interval 2 may be used to train RRM-2. The training of RRM-2 may be performed using only the second dataset, and may use no data from the first dataset.

With continued reference to FIG. 2, inferencing with the sub-models RRM, and RM_t+1, may be performed 210 using the dataset collected between time t and t+1. Particularly, each of the sub-models may be used to make an inference/prediction/forecast based on that dataset. The outputs, or values, generated by each of the sub-models using the dataset may then be stored.

The values generated by the sub-models may then be used to calculate 212 a delta, or absolute difference between the values, which may then be plotted. In more detail, the delta may be calculated as the absolute difference between the respective inference values of RRM and RM_t+1.

A check 214 may then be performed to determine if ts_max has been reached. If so, the method 200 may advance to drift mode classification 216. At 216, the various deltas, each calculated with reference to the inference generated by RRM, may be concatenated into a time series TS, and a drift mode classification applied based on the plot of the time series. On the other hand, if it is determined 214 that ts_max has not yet been reached, the method 200 may increment 215 a counter, and then return to 206.

B.1 Reference Model

With continued reference to the example operations disclosed in FIG. 2, attention is directed to further details concerning some examples of a reference reduced model RRM. In some embodiments, an overfitted reduced reference model $R_0$ may be trained at the start of this interval, at a timestamp to. This model is referred to as a "reference" model because all other sub-models, or reference reduced models, may be compared to this one. This model is also referred to as "reduced" because it is trained with a small subset do of data that is captured immediately preceding to. Embodiments may adopt this approach of using only a small subset of data because the same number of observations that compose this subset may have to be available during the next time steps, so as to enable composition of iterative versions of the reduced models. This reduced reference model $R_0$ may be stored for the remainder of the iterations.

B.2 Iterative Training of Reduced Models

Data, from continuous ongoing acquisition, may also be stored until the next time step $t_1$ is reached. At that point, another reduced model $R_1$ may trained to the point of overfitting, in the same fashion as $R_0$. This is disclosed in FIG. 3.

Figure 3:
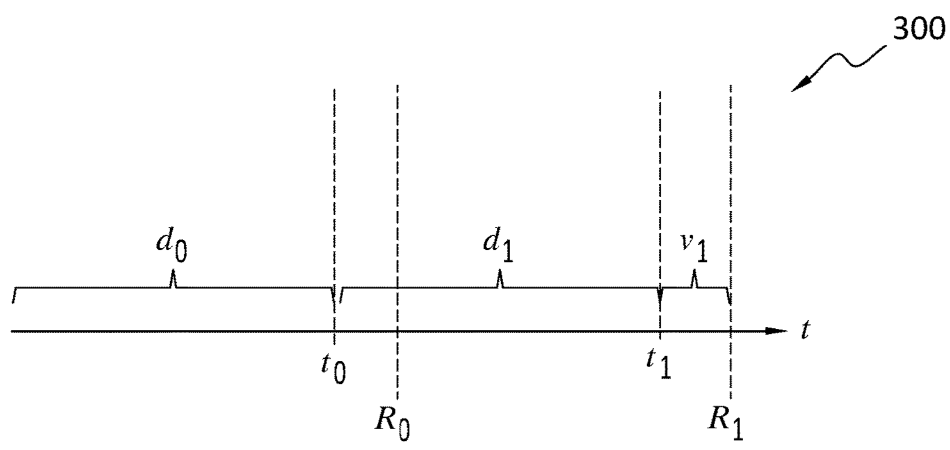
FIG. 3 discloses an example approach for training a reduced reference model according to some embodiments.

Notice, in the example graph 300 of FIG. 3, that the next time step $t_1$ is defined to take place after data $d_1$ is collected. Data $d_1$ may be of the same, or similar, volume of data $d_0$. Hence, the RRM, and all subsequent reduced models, are trained with a comparable number of data samples, although the training data samples differ from one reduced model to the next. Furthermore, because datasets such as $d_0$ and $d_1$ are relatively small, the training can be performed quickly. At $t_1$, as shown in FIG. 3, the training time for the model $R_1$ is complete, and the model $R_1$ is available for performing inferencing processes.

With continued reference to FIG. 3, the data v1 collected during the training of $R_1$ is then used as input for both $R_0$ as well as for $R_1$. The inference results of $R_0$ and $R_1$ over these never-seen-before observations $v_1$ are likely to differ—recall that both models are trained to overfit their respective training data. Since $R_0$ will try to extrapolate its learned assumptions about the data, $R_0$ will yield a prediction likely with errors, as $R_0$ was overfitted in the original training data do. On other hand, the relatively more recently overfitted reduced model $R_1$ may yield a better output, based on the input $v_1$, since it was trained on more up-to-date data, that is, the data collected between $t_0$ and $t_1$. Embodiments may compute the difference between these respective inference results produced by $R_0$ and $R_1$, and store that difference as a $\delta_1$ value.

This process as described above may be repeated n times, that is, until a model $R_n$ trained at timestamp $t_n$ is made available. Notice that all of the iterative reduced models $R_1 \ldots$ Rn may always be compared to the reference model $R_0$, and thus the values of $\delta_1 \ldots \delta_n$ may all be determined relative to the performance of the same model, that is $R_0$. It is noted further that the iterative reduced models R1 . . . Rn may not used for actual decision making in the domain. Rather, they may be quickly trained and used only for estimating the change in the performance of the reference model from the original data to when performing over the most recent data.

B.3 Drift Mode Curve

At the end of the iterative process discussed above, embodiments may operate to obtain a drift mode progression comprising a sequence of those δ values computed. This sequence may be referred to as the drift mode progression, and may be used to inform a drift mode classification task.

This drift mode classification task may be important as the literature identifies a certain number of drift patterns for which certain methods of drift detection are known to be best. There are many classification schemes that can be performed, with many possible methods from literature. Some embodiments may comprise a non-trainable pipeline that may leverage a set of template drift mode curves, such as the examples disclosed in FIG. 1. A pipeline according to some embodiments may comprise the following operations:

1. obtain a reference database of drift mode curves—in some embodiments, only a few (or single) examples from each template may be provided, while in others, an expert user may create many possibilities for the same drift modes from FIG. 1—the creation of a database of representative drift curves may also leverage historical data, if drift periods are annotated, or generate synthetic curves based on the rules that define each template—further, the larger the database, the more reliable the output may be;
2. obtain the drift mode progression generated by the current reference model and one or more of the iterative reduced models, from the online stage; and
3. obtain a drift mode curve from the database that most closely matches the drift mode progression—this process may rely on obtaining a distance metric between the drift mode progression and each drift mode curve in the database, where any suitable distance metric may be applied, though methods such as the Dynamic Time Warping may be more resilient to different in the lengths of the series compared—other distances may require resampling of the drift mode progression to match the size of the template curve(s) and, in some embodiments, this kind of resampling may be performed by typical down-sampling methods like moving average or neighborhood analysis—finally, the drift mode curve with the largest similarity may be output by some embodiments as the most likely drift type.

It is noted that in an alternative embodiment, the database of drift curves may further relate all curves generated from a same template as belonging to a family of curves. In that case, some embodiments may change operation 3 (above) to consider the aggregate differences of the families of curves to the drift mode progression. Thus, embodiments may, for example, calculate the respective average of similarities for each family of curves. Some embodiments may alternatively obtain the average of the similarities of the best k members of the family, that is, the k instances most similar to the drift mode progression. The family with the largest aggregate similarity may then be output as the drift type.

Notice that some embodiments of the method for obtaining the drift mode curve(s) may not require training. However, it may be substituted for any machine learning method that deals with time series classification, or may be used to compare features using statistical methods. Many such alternative embodiments may rely on a database of a family of curves.

Figure 4:
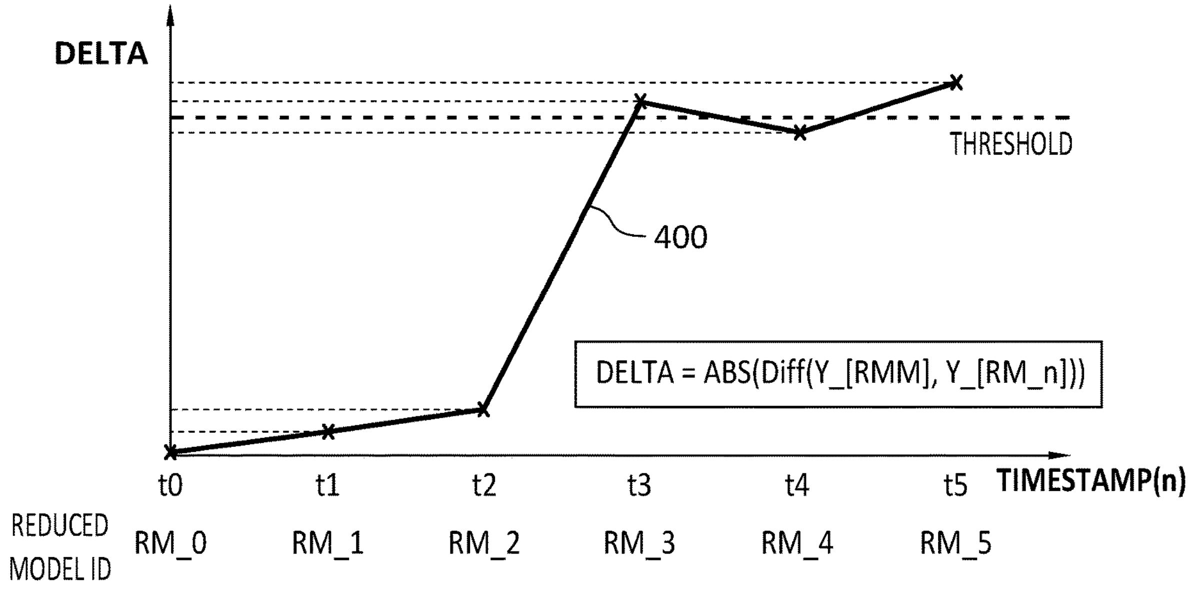
FIG. 4 discloses an example drift progression structure according to some embodiments.

For the sake of clarity and illustration, FIG. 4 presents a drift mode evolution 400 with its main indexes and components. The example of FIG. 4 is a hypothetical representation of a sudden drift, occurring between time $t_2$ and time $t_3$. An advantage of some embodiments is that they may leverage supervised or unsupervised models if their outputs are the same, that is, $R_0$ and each $R_i$ must be the same type of model with the same type of outputs. Also, by retraining a new model, that is, a sub-model, each time, no error is accumulated, a property highly desirable for such methods.

B.4 Continuous Application of Some Example Methods

As noted, the methods described above may be performed for a fixed number of iterations n. In some embodiments, a method may be extended to continuous application by a simple procedure of 'promoting' one of the latter iterative models Ri from a previous iteration to the be the new reference model R' of a further iteration. In that case, the reduced models $R_j \ldots R_n$, for i<j<n, in the first iteration may be immediately considered as models $R'_1 \ldots R'_{n-1}$. Thus, to complete this next iteration, it may only be necessary to train i reduced models, that is, $R'_{n-i+1} \ldots R'_{1n}$.

It is note that while other approaches for building the drift model progression exist, they are primarily based on the result, that is, the inference, of the main model, and thus would be restricted to that scenario. Such other approaches also depend on ground truth data, which is not always available.

C. EXAMPLE METHODS

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

D. FURTHER EXAMPLE EMBODIMENTS

Following are some further example embodiments of the invention. These are presented only by way of example and are not intended to limit the scope of the invention in any way.

Embodiment 1. A method, comprising: defining a time window during which a drift mode of a machine learning model will be evaluated, and the time window begins at $t_0$; training, beginning at the time $t_0$, a reduced reference model $R_0$ with a data sample $d_0$ that is a subset of a training dataset that was used to train the machine learning model; for 'n' iterations: at a time $t_i$, when new data samples $d_i$ are available, train a new version $R_i$ of the reduced reference model $R_0$; after $R_i$ is trained, collect data $v_i$; and compare respective inference values generated by the reduced reference model $R_0$ and $R_i$, using the data samples $d_0$ and $v_i$, and store an absolute difference between the inference values; defining a drift mode curve using the absolute differences; and based on the drift mode curve, determining a drift mode of the machine learning model.

Embodiment 2. The method as recited in embodiment 1, wherein the reduced reference model is trained to the point of overfitting the data sample $d_0$.

Embodiment 3. The method as recited in any of embodiments 1-2, wherein the new version $R_i$ is trained to the point of overfitting the data sample $d_i$.

Embodiment 4. The method as recited in any of embodiments 1-3, wherein the drift mode is one of: a sudden drift; a gradual drift; a recurring drift; or, an incremental drift.

Embodiment 5. The method as recited in any of embodiments 1-4, wherein determining a drift mode comprises using a machine learning process to correlate the drift mode curve to a drift mode curve template.

Embodiment 6. The method as recited in any of embodiments 1-5, wherein the machine learning model is retrained, or replaced, based on the drift mode curve.

Embodiment 7. The method as recited in any of embodiments 1-6, wherein the data samples $d_0$ and $d_i$ are about the same size as each other.

Embodiment 8. The method as recited in any of embodiments 1-7, wherein the machine learning model is supervised or unsupervised, and the machine learning model is trained to resolve a classification problem or a regression problem.

Embodiment 9. The method as recited in any of embodiments 1-8, wherein the versions $R_i$ of the reduced reference model $R_0$ do not suffer from drift.

Embodiment 10. The method as recited in any of embodiments 1-9, wherein determining a drift mode of the machine learning model comprises using a distance function to identify a template drift mode curve that most closely matches the drift mode curve.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
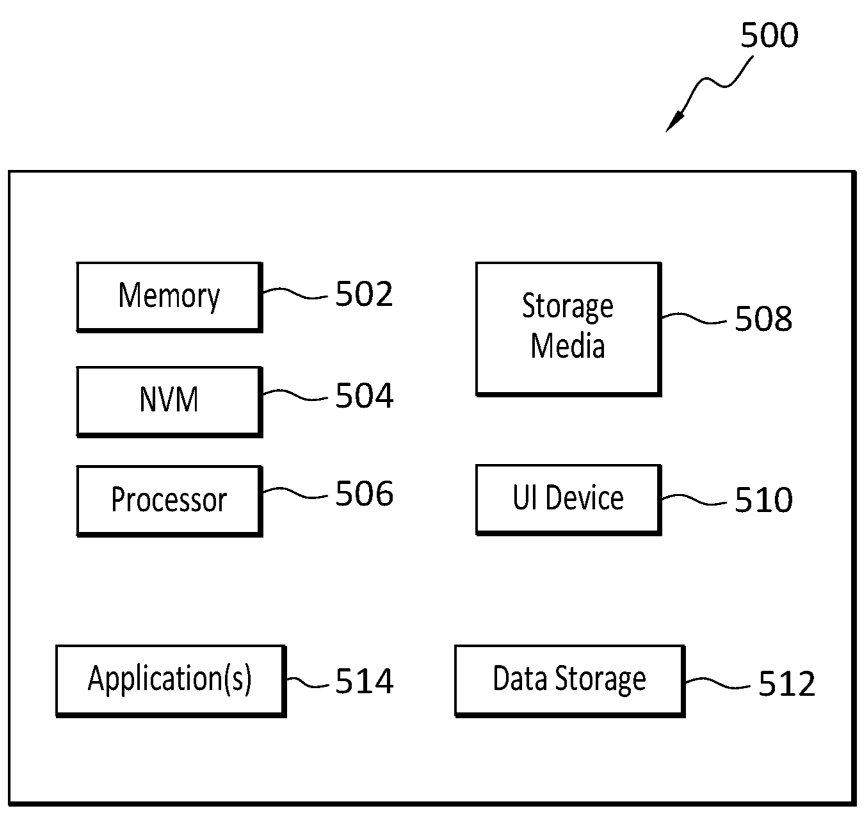
FIG. 5 discloses an example computing entity operable to perform any of the disclosed methods, processes, and operations.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI (user interface) device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

defining a time window during which a drift mode of a machine learning model will be evaluated, and the time window begins at $t_0$;

training, beginning at the time $t_0$, a reduced reference model $R_0$ without ground truth data but with a data sample $d_0$ that is a subset of a training dataset that was used to train the machine learning model, wherein the reduced reference model $R_0$ is distinct from the machine learning model and is trained to a point of overfitting;

for 'n' iterations:

at a time $t_i$, when new data samples $d_i$ are available, training a reduced reference model $R_i$ distinct from the machine learning model and from the reduced reference model $R_0$, wherein $R_i$ is trained with the data samples $d_i$ and is trained to a point of overfitting;

after $R_i$ is trained, collecting data samples $v_i$ from a time when the new data samples $d_i$ are acquired to a time when training the reduced reference model $R_i$ is complete; and comparing respective inference values generated by the reduced reference models $R_0$ and $R_i$, by inputting the data samples $v_i$ to the reduced reference models $R_0$ and $R_i$, and storing an absolute difference between the inference values;

defining a drift mode curve using the absolute differences;

based on the drift mode curve, determining a drift mode of the machine learning model; and based on the drift mode, determining a moment at which the machine learning model is retrained or replaced.

2. The method as recited in claim 1, wherein the drift mode is one of: a sudden drift; a gradual drift; a recurring drift; or, an incremental drift.

3. The method as recited in claim 1, wherein determining a drift mode comprises using a machine learning process to correlate the drift mode curve to a drift mode curve template.

4. The method as recited in claim 1, wherein the data samples $d_0$ and $d_i$ are about the same size as each other.

5. The method as recited in claim 1, wherein the machine learning model is supervised or unsupervised, and the machine learning model is trained to resolve a classification problem or a regression problem.

6. The method as recited in claim 1, wherein the reduced reference model $R_i$ of the reduced reference model $R_0$ do not suffer from drift.

7. The method as recited in claim 1, wherein determining a drift mode of the machine learning model comprises using a distance function to identify a template drift mode curve that most closely matches the drift mode curve.

8. A non-transitory storage medium having stored therein instructions that are executable by one or more hardware processors to perform operations comprising:

defining a time window during which a drift mode of a machine learning model will be evaluated, and the time window begins at $t_0$;

training, beginning at the time $t_0$, a reduced reference model $R_0$ without ground truth data but with a data sample $d_0$ that is a subset of a training dataset that was used to train the machine learning model, wherein the reduced reference model $R_0$ is distinct from the machine learning model and is trained to a point of overfitting;

for ‘n’ iterations:

at a time $t_i$, when new data samples $d_i$ are available, training a reduced reference model $R_i$ distinct from the machine learning model and from the reduced reference model $R_0$, wherein the reduced reference model $R_i$ is trained with the data samples $d_i$ and is trained to a point of overfitting;

after $R_i$ is trained, collecting data samples $v_i$ from a time when the new data samples $d_i$ are acquired to a time when training the reduced reference model $R_i$ is complete; and comparing respective inference values generated by the reduced reference model $R_0$ and $R_i$, using the data sample $v_i$, to the reduced reference models $R_0$ and $R_i$ and storing an absolute difference between the inference values;

defining a drift mode curve using the absolute differences;

based on the drift mode curve, determining a drift mode of the machine learning model; and based on the drift mode, determining a moment at which the machine learning model is retrained or replaced.

9. The non-transitory storage medium as recited in claim 8, wherein the drift mode is one of: a sudden drift; a gradual drift; a recurring drift; or, an incremental drift.

10. The non-transitory storage medium as recited in claim 8, wherein determining a drift mode comprises using a machine learning process to correlate the drift mode curve to a drift mode curve template.

11. The non-transitory storage medium as recited in claim 8, wherein the data samples $d_0$ and $d_i$ are about the same size as each other.

12. The non-transitory storage medium as recited in claim 8, wherein the machine learning model is supervised or unsupervised, and the machine learning model is trained to resolve a classification problem or a regression problem.

13. The non-transitory storage medium as recited in claim 8, wherein the reduced reference model $R_i$ of the reduced reference model $R_0$ do not suffer from drift.

14. The non-transitory storage medium as recited in claim 8, wherein determining a drift mode of the machine learning model comprises using a distance function to identify a template drift mode curve that most closely matches the drift mode curve.

* * * * *